United States Patent [19]
Djelouah et al.

[11] Patent Number: 5,281,310
[45] Date of Patent: Jan. 25, 1994

[54] SEA WATER DESALINATING APPARATUS

[76] Inventors: Myriam Djelouah; Nadia Djelouah, both of Route d'Orléans, 45500 Saint Denis de l'Hotel, France

[21] Appl. No.: 810,951
[22] Filed: Dec. 19, 1991
[30] Foreign Application Priority Data Dec. 21, 1990 [FR] France .................. 90 16119

[51] Int. Cl.⁵ .................. B01D 3/02; C02F 1/14
[52] U.S. Cl. .................. 202/185.1; 202/185.2; 202/234; 202/268; 126/635; 126/652; 203/10; 203/DIG. 1; 203/DIG. 16
[58] Field of Search .......... 203/10, DIG. 1, DIG. 16; 202/234, 185.1, 185.2, 268; 159/DIG. 28; 126/652, 635, 639

[56] References Cited

U.S. PATENT DOCUMENTS

| | | | |
|---|---|---|---|
| 2,342,201 | 2/1944 | Kain . | |
| 3,875,926 | 4/1975 | Frank | 126/635 |
| 3,923,038 | 12/1975 | Cutchaw | 126/635 |
| 4,027,653 | 6/1977 | Meckler | 126/635 |
| 4,156,420 | 5/1979 | Gunderson . | |
| 4,166,769 | 9/1979 | Dukess | 203/DIG. 1 |
| 4,194,949 | 3/1980 | Stark | 203/DIG. 1 |
| 4,327,552 | 5/1982 | Dukess | 203/DIG. 1 |
| 4,365,615 | 12/1982 | Melvin . | |
| 4,421,606 | 12/1983 | Tsumura et al. | 203/DIG. 1 |
| 4,505,260 | 3/1985 | Metzger | 126/652 |
| 4,523,576 | 6/1985 | Waschow . | |
| 4,680,090 | 7/1987 | Lew | 203/DIG. 1 |

FOREIGN PATENT DOCUMENTS

| | | |
|---|---|---|
| 3222896 | 12/1983 | Fed. Rep. of Germany . |
| 3509601 | 9/1986 | Fed. Rep. of Germany . |
| 251270 | 8/1983 | France . |
| 2536157 | 5/1984 | France . |
| 2591323 | 6/1987 | France . |

Primary Examiner—Wilbur Bascomb, Jr.
Attorney, Agent, or Firm—Seidel, Gonda, Lavorgna & Monaco

[57] ABSTRACT

A solar apparatus such as a solar water heater or cooler comprising a cell which is partially transparent to the sun's rays and has an internal section formed by an assembly of two casing which surround one another and define the variable capacity of the absorber as well as various means for supplying, storing and discharging water.

3 Claims, 4 Drawing Sheets

1

SEA WATER DESALINATING APPARATUS

FIELD OF THE INVENTION

The present invention relates to a solar water heater.

BACKGROUND OF THE INVENTION

In recent years scientists have become aware of the fact that solar energy has the advantage of being cheap and above all particularly "clean"; increasing awareness of problems connected with the protection of the environment has resulted in the considerable development of research in order to make optimum use of this energy and a whole series of solar-powered apparatus destined especially for heating or cooling purposes and more particularly intended for the inhabitants of sunny or tropical areas has appeared on the market.

In most cases, however, these apparatus are based on the use of large solar panels which are thus particularly bulky and their use is consequently restricted to relatively large installations.

Hitherto a solar apparatus of sufficiently restricted dimensions to be portable, which is able to supply hot water to consumers such as campers or amateur sailors in satisfactory conditions has never been proposed.

OBJECTS OF THE INVENTION

A first object of the present invention is to remedy this shortcoming by proposing a solar heating system which operates extremely simply and can be dimensioned such that it can meet the hot water requirements of dwellings or an assembly of dwellings or satisfy the needs of users such as campers or amateur sailors as necessary.

In accordance with the invention, this solar water heater is characterised in that it comprises a heating cell which is partially transparent to the sun's rays and comprises on its interior an assembly of two closed casings which surround one another, i.e. an outer casing made from a material, in particular a plastics material, which is transparent to the sun's rays, and an inner casing made from a material which absorbs these rays and defining on its interior a heating chamber for varying the storage volume or temperature; a duct for supplying the heating chamber with water to be heated; means enabling the capacity of the heating chamber to be varied; a hot water reservoir covered on its periphery with an insulating material and connected to the heating chamber by means of a heating duct provided with a valve which can be controlled from the exterior; a hot water draw-off tap mounted on the external section of the hot water reservoir, and a duct for discharging any steam produced in the heating chamber, this discharge duct preferably being equipped with a safety valve.

In accordance with the above configuration, there is created between the internal volume (cylinder) and the external volume (cylinder) a first greenhouse effect superimposed by a second greenhouse effect generated between the transparent outer wall of the cell and the outer cylinder; the result thereof is vigorous heating of the liquid introduced into the heating chamber via the feed duct, the efficiency of which heating can be further increased by decreasing the volume of the heating chamber. It only remains for the user to transfer the hot water into the reservoir with which the cell is provided before distributing it by turning the tap provided for this purpose.

The particularly advantageous feature of the above-mentioned water heater is to a large extent connected with the particular configuration of the means enabling the capacity of the heating chamber to be varied, which enables the heating of the water introduced into this chamber to be controlled.

In accordance with a preferred feature of the invention, these means consist of a partition component which extends longitudinally in the heating chamber and on which there is secured a bellows cooperating with an adjustable sliding rod which can be manoeuvred from the exterior in order to vary the volume of the said bellows.

It will clearly be appreciated that the water is heated to a greater degree, the more the volume of the bellow is increased.

In view of the fact that the hot water distributed by the apparatus in accordance with the invention is above all intended for consumption, it is not intended to add an antifreeze thereto; nevertheless, in order to enable the heating chamber to respond to possible dilation as a result of the water therein freezing, in accordance with the invention it is advantageous to attach a compensating spring to the sliding rod.

In accordance with the invention, it is further necessary to equip the inner cylinder and the outer cylinder with apertures cooperating with a flap in order to enable the partition and bellows to be introduced into the heating chamber, as well as to allow the latter to be cleaned. By way of example the cylinders may be secured to the flap by flanging.

Furthermore, it is well known that in countries which are hot or where it is very sunny and in which economically viable use of solar energy may be envisaged, it is just as important, if not more so, to be able to have available refrigeration or air conditioning apparatus rather than heating apparatus.

In accordance with the invention, it has been observed that a cell which to a large extent is similar to the above-mentioned water heater heating cell could be used for cooling or air conditioning simply by undergoing minor modifications.

A second object of the invention is to propose a cooling or air conditioning apparatus comprising a cooling cell of this type.

This cell only differs from the aforementioned heating cell by the configuration of the inner cylinder:

In effect, and in accordance with a further feature of the invention, this volume (cylinder) which on its interior defines a cooling chamber, bears on its outer face a covering made from a moisture-absorbing material, in particular lightweight felt, and cooperates with a water reservoir provided with irrigation apertures in order to enable the absorbent covering, in particular of lightweight felt, to be humidified.

It is evident that the aforementioned double wall produced firstly between the outer cylinder and the inner cylinder and secondly between the transparent wall of the cooling cell and the outer cylinder, causes continuous evaporation of the water accumulated on the surface of the felt as a result of circulation of the air by means of the fan which, in view of the endothermic nature of this reaction, engenders cooling by a heat pump effect of the inner volume of the cooling chamber, and in particular of the water introduced thereinto via the cooling duct. This double casing may likewise be omitted so as to enable it to evaporate in the fresh air.

It will be appreciated that this cooling effect is all the more efficient, the smaller the volume of the cooling chamber, and may be regulated by adjusting the means which enable the capacity of the chamber to be varied and which are arranged in a similar manner to the corresponding means in the case of the water heater.

In accordance with the invention, it is possible to draw off cooled water after it has been transferred into the cold water reservoir or even to recover cold air via the discharge duct in order to use it subsequently for any suitable purpose.

In accordance with a further feature of the invention enabling the efficiency of the cooling system to be increased, the inner cylinder of the apparatus comprises a conical end cooperating with the corresponding plane circular end of the outer cylinder so as to define a ventilation chamber in which there is mounted a fan which can encourage evaporation of the water with which the lightweight felt is saturated. Depending on the case, this fan may be controlled by a small motor, in particular an electric motor, or even by means of solar panels.

The cell constituting the solar water heater or even the cooling or air conditioning apparatus which is the subject of the invention may, of course, be of any configuration without departing from the scope of this invention, the sole requirement being to seek to use solar energy in an optimum manner.

To this end, and in accordance with the most usual configuration of the invention, the cell comprises a curved wall, preferably with a parabolic cross-section, which is transparent to the sun's rays, as well as two rectilinear walls which are preferably perpendicular and bear a covering which reflects these rays.

The curved wall is preferably mounted so as to be movable on the rectilinear walls and thus acts as a cover providing access to the inner section of the cell.

In accordance with a variant of the invention, the cell comprises a wall which is transparent to the sun's rays and is substantially planar but provided with steps of the Fresnel lens type so as to focus the rays in a linear manner, as well as a curved wall bearing a covering which reflects these rays.

In certain particular cases, this arrangement may have the advantage of enabling the apparatus to function as a thermosyphon, the water reservoir then being located in the upper section of the apparatus which can increase the capacity thereof.

Independently of the need for users to be able to have available hot or cold water, or even cool air which can be used for air conditioning, there is a crucial lack of freshwater in hot or tropical areas which is tending to become increasingly more widespread.

In order to overcome these problems, the concept of desalinating sea water has existed for a long time; the majority of installations proposed hitherto for this purpose are, however, particularly sophisticated and as yet no sea water desalination apparatus has been proposed which may be used by individuals (individual dwellings, campers, amateur sailors) in viable economic conditions.

A third aim of the invention is to propose an apparatus of this type.

In accordance with the invention, this apparatus is characterised in that it is formed by the combination of a heating cell and a cooling cell of the type mentioned above, the discharge ducts of these two cells being connected so as to introduce the steam produced in the heating chamber into the cooling chamber which then acts as a condenser. The desalinated water may thus be recovered directly by turning the tap on the cold water reservoir; in order to increase the capacity of this reservoir, it is advantageous according to a further feature of the invention to connect it to the cold water reservoir of the cooling cell, evidently when the valve connecting this reservoir to the heating chamber has been closed.

It will be appreciated that the apparatus according to the invention may be equipped with other components such as level indicators in the various chambers or reservoirs, for example, without departing from the scope of the invention.

In conclusion, the invention enables a combined apparatus to be proposed which is formed by the association of two cells which may in particular be enclosed in a small suitcase and may be used either separately for heating or cooling or together for desalinating sea water. Depending on its dimensions, this apparatus may be suitable eithe as a main source of energy for a villa or a group of dwellings, or as a main source of energy or emergency source of energy for users such as campers or amateur sailors.

BRIEF DESCRIPTION OF THE DRAWINGS

The features of the apparatus which is the subject matter of the invention will be described in greater detail with reference to the attached drawings in which.

DETAILED DESCRIPTION OF THE PREFERRED EMBODIMENT

Figure 1:
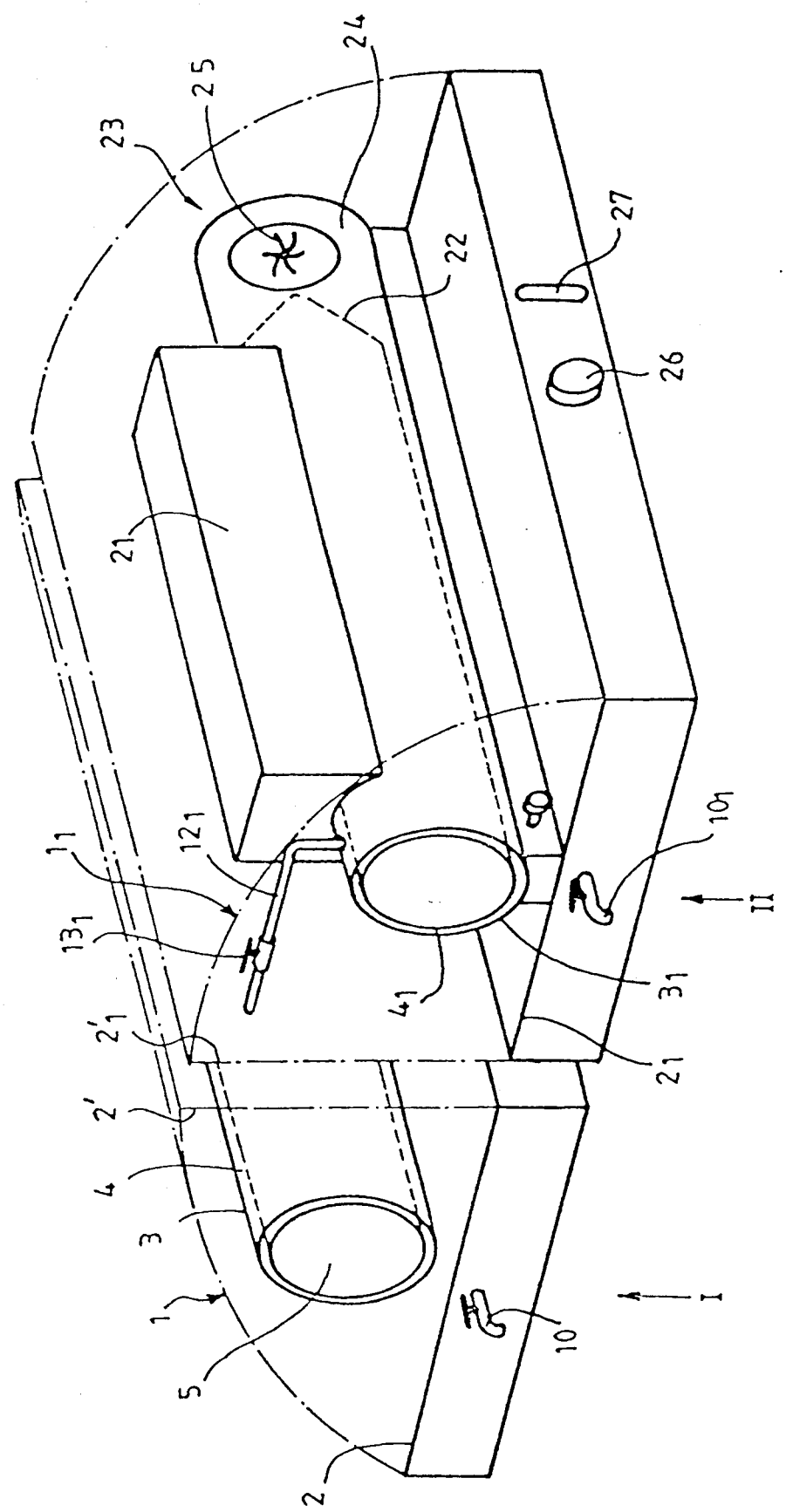
FIG. 1 is a schematic perspective view showing an apparatus according to the invention.
Figure 2:
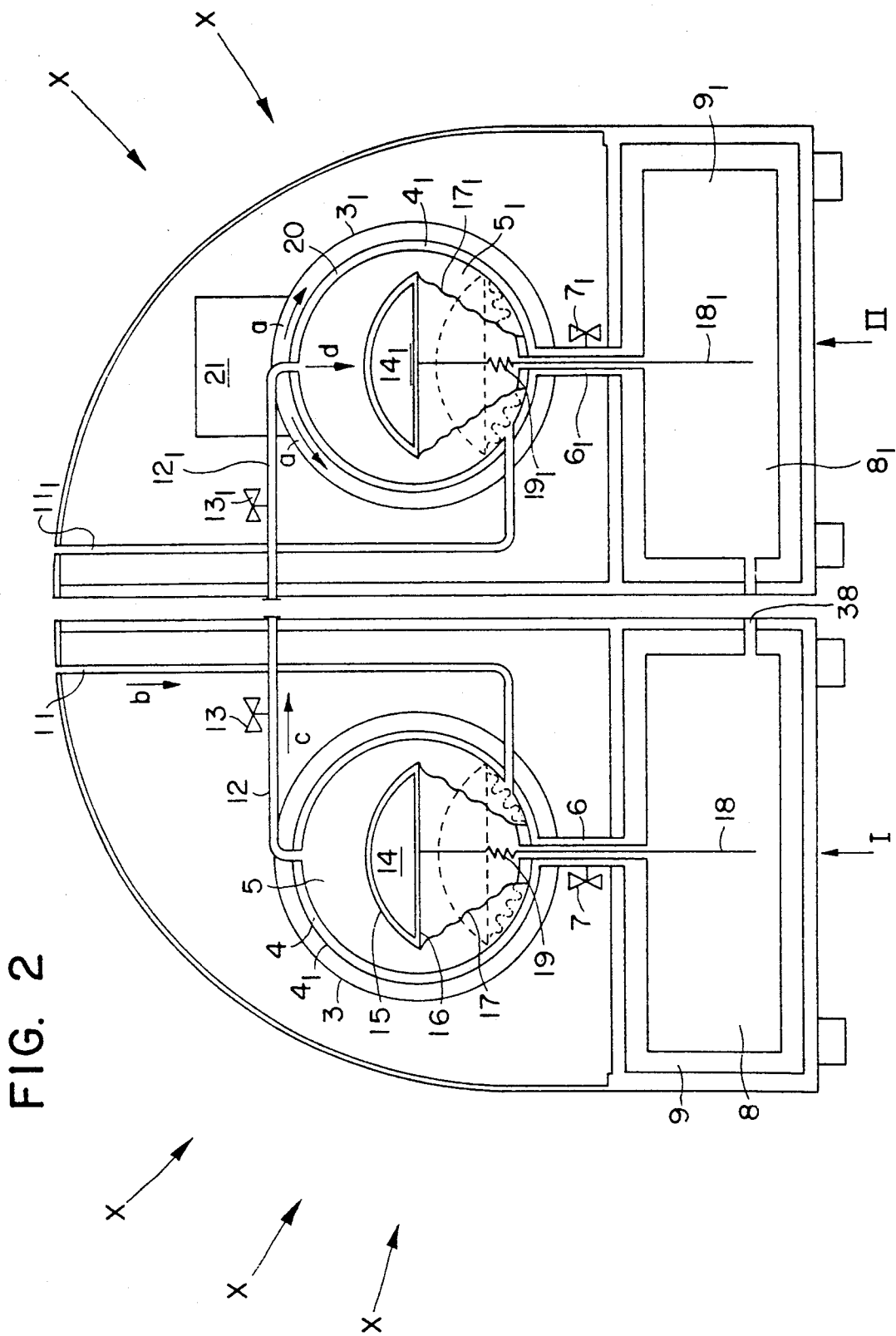
FIG. 2 is a transverse section through the apparatus illustrated in FIG. 1.

In accordance with FIGS. 1 and 2, the apparatus is formed by the combination of two cells I and II which may be used independently for heating or cooling water and together for the desalination of sea water.

The cell I which corresponds to a solar water heater comprises a wall 1 which is transparent to the sun's rays and has a parabolic cross-section, as well as two planar walls 2 and 2' which are perpendicular to one another and provided with a reflective covering.

In a manner not illustrated in the Figures, the transparent wall 1 is articulated on one of the planar walls 2, 2' and thus forms a cover providing access to the interior of the cell.

In accordance with FIGS. 1 and 2, two casings, for example two concentric cylinders 3, 4 with a longitudinal axis, are mounted inside the cell I; the outer cylinder 3 is made from a transparent plastic material and the inner cylinder 4 is formed from or provided with a covering 4' which absorbs the sun's rays and defines a heating chamber 5 on its interior.

In accordance with FIG. 2, a heating duct 6 provided with a valve 7 which can be controlled from the exterior enables the heating chamber 5 to be connected to a hot water reservoir 8 located in the lower section of the cell I, and bearing on its periphery an insulating covering 9. In accordance with FIG. 1, a tap 10, mounted on the outside of the reservoir 8, enables the water therein to be drawn off.

In accordance with FIG. 2, the heating chamber 5 is furthermore connected to a duct 11 for supplying water to be heated, which opens out at its lower section and is provided with closure means, not illustrated, as well as to a discharge duct 12 which opens out in its upper section and is provided with a safety valve 13. As will be described in greater detail hereinbelow, this duct 12, which enables the steam produced in the heating chamber 5 to be discharged towards the exterior, opens at the planar wall 2' of the cell I and may if necessary be connected to a similar duct in the cooling cell II if the apparatus is used to desalinate sea water.

It is evident that if the cell I is exposed to the sun's rays, illustrated by arrows X, a double greenhouse effect is created, firstly between the transparent walls 1 and 3 and secondly between the transparent wall 3 and the absorbent wall 4; this results in rapid heating of the water present in the heating chamber 5, which is all the more efficient, the smaller the volume of this chamber.

A particular device enables this heating process to be controlled by varying the volume of the chamber 5; this device comprises a longitudinal partition 14 having a crescent-shaped cross-section comprising a curved face 15 as well as a planar face 16 on which there is secured a bellows 17 which can move between an unfolded position corresponding to the minimum volume of the chamber 5, represented by solid lines in FIG. 2, and a retracted position corresponding to the maximum volume of the chamber 5 illustrated in dashed lines in this same Figure. A sliding rod 18 which can be manipulated from the exterior is secured to the wall 16 of the partition 14 in order to enable the bellows 17 to be displaced in this way.

A spring 19 is mounted on the rod 18 so as to provide the assembly composed of the partition 14 and the bellows 17 with the resilience necessary for enabling the chamber 15 to compensate for any expansion which may result from the water therein freezing. and thus to avoid having to add an antifreeze thereto in order to prevent any accidental damage to the various ducts.

In accordance with FIGS. 1 and 2. the configuration of the cooling cell II is to a large extent similar to that of the heating cell I. It is formed by the combination of two perpendicular planar walls $2_1$. $2'_1$ bearing a reflective covering and a curved wall having a parabolic cross-section $1_1$ which is articulated on the planar walls and thus acts as a cover.

On its interior the cell II comprises an assembly of two closed concentric cylinders $3_1$. $4_1$. i.e. an outer cylinder $3_1$ made from a plastics material which is transparent to the sun's rays and an inner cylinder $4_1$ which defines in its interior a cooling chamber $5_1$ of which the volume may be varied by means of a device formed by the combination of a partition $14_1$, a bellows $17_1$ and a sliding rod $18_1$ having a configuration similar to that of the corresponding components 14, 17, 18 which enable the volume of the heating chamber 5 of the heating cell I to be varied.

A cooling duct $6_1$ provided with a valve $7_1$ which can be controlled from the exterior enables the cooling chamber $5_1$ to be connected to a cold water reservoir $8_1$ of which the walls are covered with an insulating material $9_1$.

The cooling chamber $5_1$ is furthermore connected to the exterior firstly via a feed duct $11_1$ provided with closure members and opening in its lower section and secondly via a cold air discharge duct $12_1$ which is provided with a stop valve $13_1$ and can be connected to the discharge duct 12 of the heating cell I.

A tap $10_1$ (FIG. 1) furthermore enables the water in the cold water reservoir $8_1$ to be drawn off.

In accordance with FIG. 2, the inner cylinder $4_1$ of the cooling cell II has a different arrangement from that of the inner cylinder 4 of the heating cell I. It is in effect covered on its outer face with a lightweight felt 20 which can absorb moisture and cooperates with a reservoir 21 provided with irrigation apertures, not illustrated, which enable the felt to be humidified as illustrated schematically by the arrows a.

In view of this arrangement, it is evident that the water absorbed by the lightweight felt evaporates under the effect of the sun's rays X resulting in a cooling of the inner volume of the cooling chamber $5_1$, and in particular of the water introduced thereinto via the feed duct $11_1$. This cooled water may then be transferred to the cold water reservoir $8_1$ by opening the valve $7_1$ and distributed by the tap $10_1$. Varying the volume of the cooling chamber $5_1$, by turning the knob 26, enables the features of the cooling system to be controlled.

In accordance with FIG. 1, the inner cylinder $4_1$ has a conical end 22 cooperating with the corresponding planar end 23 of the outer cylinder $3_1$ so as to define a ventilation chamber 24 in which there is mounted a fan 25 which may be supplied via an auxiliary motor or even by solar panels. This configuration is such that it increases the efficiency of the evaporation process on the felt 20. A window 27 enables the water level in the reservoir $8_1$ to be checked at any moment.

In accordance with FIG. 2, the cells I and II may be combined by placing walls 11 and $11_1$ side by side and connecting discharge ducts 12 and $12_1$. The apparatus may be used for desalinating sea water. It then operates as follows:

Sea water to be desalinated is introduced as shown by arrow b into the supply duct 11 of the heating chamber 5. This water is then heated to this level and the steam produced escapes as shown by the arrow c via the discharge ducts 12, $12_1$ (the stop valves 13 and $13_1$ having previously been opened) and, in accordance with arrow d, passes into the cooling chamber $5_1$ which then acts as a condenser. The desalinated water produced in this way may then be recovered in the reservoir $8_1$ by opening the valve $7_1$ then drawn off via the tap $10_1$.

The reservoir $8_1$ may be connected to the reservoir 8 by opening a duct 38 so as to double its capacity; it is evidently essential to keep the valve 7 closed.

Figure 3:
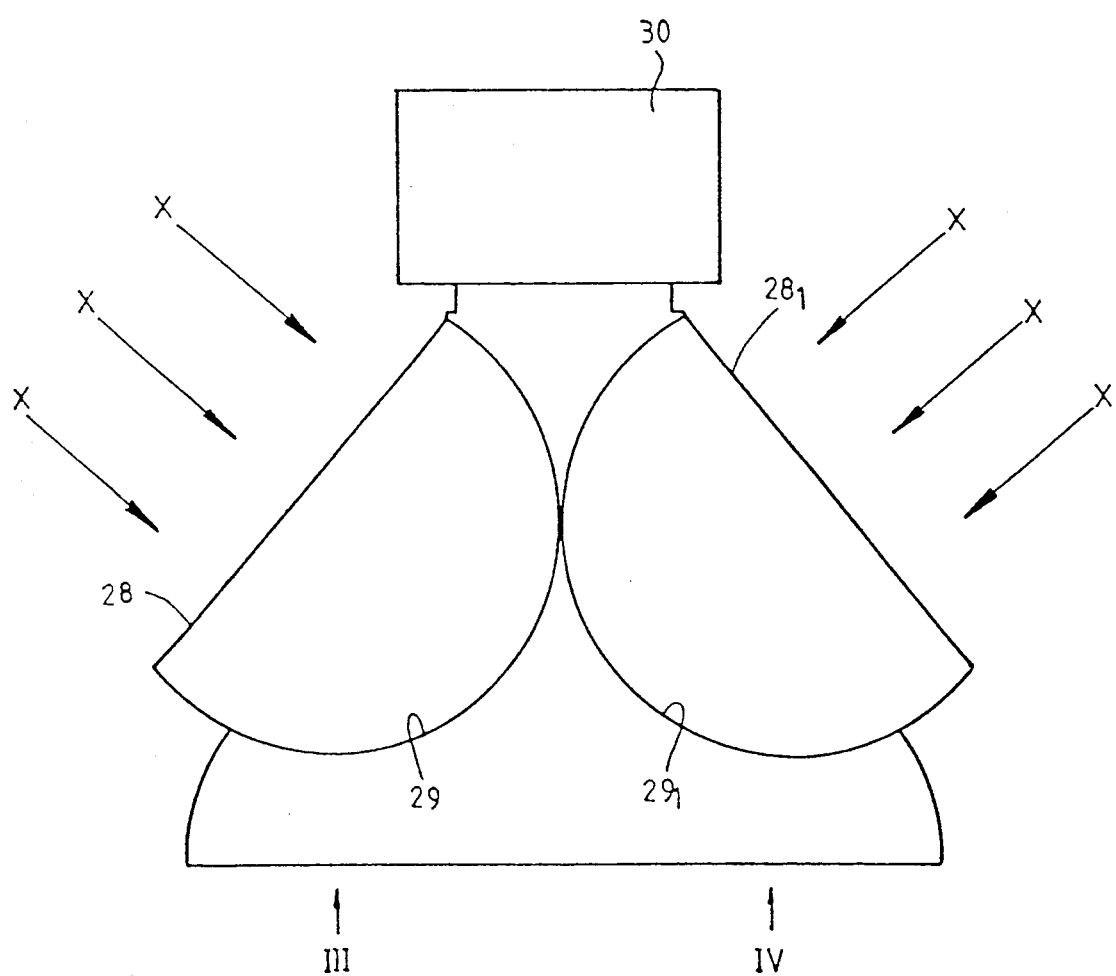
FIG. 3 is a diagram showing a variant of the invention.

In accordance with FIG. 3, the cells I and II as illustrated in FIGS. 1 and 2 are replaced by the cells III and IV each comprising a wall 28, $28_1$ which is transparent to the sun's rays X and a wall 29, $29_1$ having a cross-section in the form of a parabola and bearing a covering which reflects the rays.

These cells are provided internally with a system of concentric tubes similar to those with which cells I and II are provided respectively and which for this reason have not been illustrated in the Figure.

The transparent planar faces 28, $28_1$ have the particular feature of comprising steps of the Fresnel lens type so as to enable the light beam to be focused in a linear manner along the longitudinal axis of the heating chamber 5 and cooling chamber $5_1$.

In accordance with this apparatus, the reservoirs 8, $8_1$ are replaced by an upper reservoir 30 which enables the apparatus to operate as a thermosyphon.

In accordance with a variant which is not illustrated, in the case of a solar (water heating) apparatus of a given size, in a fixed location, it is desirable to protect the absorber against frost by discharging the contents of the absorber into the reservoir when the temperature drops greatly when the sun ha disappeared (which may be detected by a temperature sensor).

As the water circulation is normally open, i.e. the water drawn from the reservoir is replaced by new water heated in the absorber, there must be provided in the reservoir a level sensor which enables a volume sufficient for receiving water from the absorber to be left free in the reservoir. At this moment the appropriate command closes the inlet valve for the water arriving from the absorber.

In accordance with a further variant, the storage reservoir is above the absorber and they are connected via a cold water hose and a hot water hose each provided with a non-return valve which permits the water to circulate in one direction only.

It should also be noted that the absorber may be protected by an insulating curtain, for example with a winding mechanism, or by mobile screens positioned by means of a signal from a temperature sensor.

In general, the casings which surround each other and in one instance are coaxial cylinders, enable the volume of liquid to be heated in the absorber to be modified. This enables the manufacture of installations to be standardised, in particular installations for producing hot water without having to restrict their capacity to the most unfavourable situation as regards the amount of sunshine. Even a very large installation could produce sufficiently hot water (in smaller quantities), owing to the reduction in the volume of the absorber. Furthermore, the inner casing which defines the absorber capacity may be produced in various ways: it may consist of a bellows or more generally of a means which is extensible or of varying volume controlled either automatically or manually.

Figure 4:
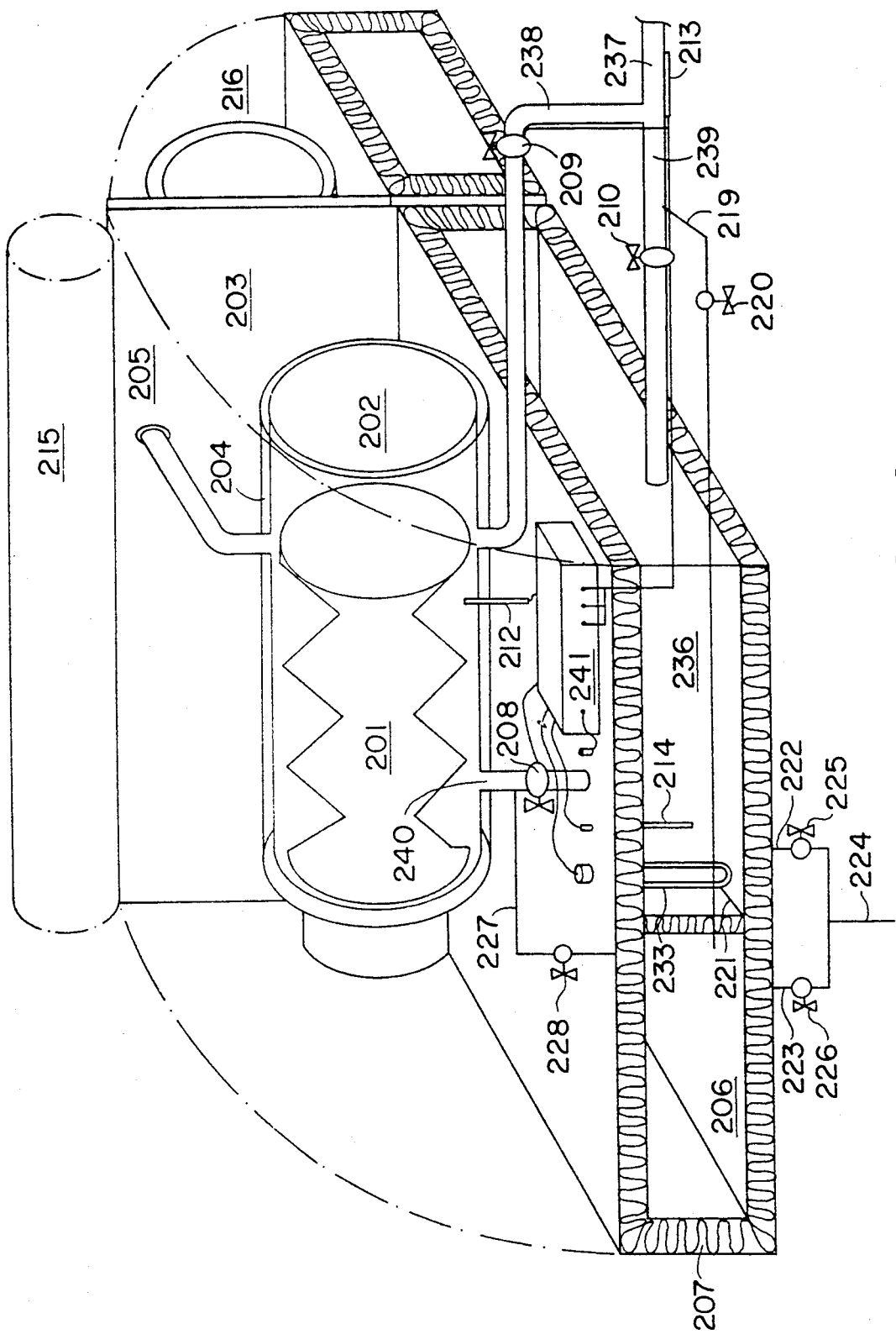
FIG. 4 is a schematic view of a further embodiment of a solar apparatus designed to operate in a fixed location in particular.

FIG. 4 shows a solar apparatus of the type described above, however intended more particularly for a fixed location installation and for this reason equipped with additional special means.

As above this solar apparatus comprises a section forming a solar water heater and a section 216 forming a cooler. Only the part of the apparatus forming a solar water heater will be studied below:

This solar water heater comprises an absorber 202 forming a solar water heater reservoir. In the interior of this absorber there is located a device for regulating the capacity of the absorber 201; in this example this device 201 consists schematically of a component having a variable volume, for example a bellows. BY unfolding this device 201 to a greater or lesser extent, the capacity of the absorber 202 is altered and consequently the volume of water to be heated is adapted to the power of the solar energy available at any given moment.

As above, this absorber 202 is located in front of a reflector 203 for example comprising a vertical wall and a horizontal wall although any other form of reflector and, in particular, a cylindrical reflector having a parabolic cross-section, may be envisaged. The assembly is protected by a cover 205 and may be covered by a protective screen 215 to prevent overheating for example when the apparatus is not in use (for example during holiday periods or when the users are away).

The absorber-reservoir 202 is surrounded by a casing 204 creating thereabout a greenhouse effect. Under the absorber 202 there is located a storage reservoir consisting of two chambers 206, 236 surrounded by an insulating wall 207 and separated by a partition 221 which itself is preferably insulating for reasons which will be mentioned below.

The solar water heater is supplied via a pipe 237 which is connected via a duct 238 provided with an electrovalve 209 to the absorber chamber 202. This pipe 237 is likewise connected via a first duct 239 provided with an electrovalve 210 to the reservoir chamber 236 and via a second pipe 219 provided with an electrovalve 220 to the second chamber 206 of the storage reservoir.

The absorber chamber 202 is connected by a first pipe 240 provided with an electrovalve 208 to the storage chamber 236 and via a second pipe 227 provided with an electrovalve 228 to the second storage chamber 206.

Each of the two storage chambers 236, 206 comprises at the outlet a duct 222, 223 each provided with an electrovalve 225, 226 and communicating with a common outlet duct 224.

The water inlet pipe 237 is provided with a nperature sensor 213. Likewise, the absorber 202 is provided with a temperature sensor 212 and the reservoir 236 is equipped with a temperature sensor 214.

Finally, this reservoir 236 is provided with an electrical resistor 233. The various sensors and electrovalves are connected to a control unit 241 which controls the operation of the apparatus.

The aim of this operation is to avoid one of the main disadvantages of known fixed location solar water heaters.

In effect, most fixed solar water heaters comprise in addition to the absorber an electrical resistor which heats the reserve amount of water on standby when the water temperature is less than a given threshold.

It may occur that the reserve of heated water is completely exhausted by successive use and at intervals reduces the sanitary equipment of the household, via the kitchen, washing-up, etc.

In these conditions, as the reservoir water is practically at the temperature of the water in the inlet duct, the resistor is immediately activated in order to heat this reserve of water. In these conditions, the solar energy provided from this moment or, for example, the next day, is not used to heat the reserve water since the water in this reserve will already have been set at the draw-off temperature.

The embodiment illustrated in FIG. 4 aims to avoid this disadvantage whilst enabling, as necessary, an amount of hot water to be obtained very rapidly without, however, heating an excessive amount of water in anticipation thereof.

The control, provided by the electronic management system 241, temperature sensors and inlet and outlet electrovalves, enables the system to function as follows:

It is firstly assumed that the total capacity of both sections 236, 206 of the reservoir of the apparatus is greater than the capacity of the absorber irrespective, moreover, of the capacity set in this absorber.

At the end of a sunny day, the volume of hot water prepared by the absorber is firstly transferred into the storage chamber 236 if there is still space available therein or into the chamber 206. The amount of water thus drawn off from the absorber 202 can thus be replaced by water from the pipe 237 by opening the electrovalve 209; this chamber may likewise remain empty if the external temperature or nocturnal radiation towards the sky risks causing the water in the absorber 202 to freeze since on the following day this water will be at a temperature lower than that in the pipe; in this case it is preferable to refill the absorber 202 only when the sun has reappeared when the sensor 212 of the absorber has detected in the absorber a temperature greater than that of the water in the supply pipe 237 (the latter having been detected by the sensor 213).

If, in the operating conditions described above, th hot water in the apparatus is exhausted and hot water is required, the user may request the control circuit 241 (by means of an apparatus connected to this control circuit 241) to prepare a given amount of hot water at a given temperature (for example 10, 20 or 40 liters of hot water at 50°). A this moment, the control circuit 241 orders the resistor 233 to be activated which will only heat the amount necessary introduced into the chamber 236 from the inlet duct 237, the duct 239 and via the electrovalve 210.

Thus the entire contents of the conventional solar water heater reservoir, which in this case would be the total content of the reservoirs 236 and 206, are prevented from being heated using the resistor 233.

The duct 219 and electrovalve 220 can supply the storage chamber 206, enabling the temperature of the water in this reservoir to be modified for example if this temperature were too hot for the required use.

Thus the solar apparatus may comprise two reservoirs of which one (disregarding the resistor 233 which provides a boost for the heat) can contain the hottest water supplied by the absorber 202 and the other, the reservoir 206, the water which is less hot. Water is always taken on demand at the desired temperature and on command via the control circuit 241 by means of the ducts 222, 223, the electrovalves 225, 226 and the discharge duct 224.

In accordance with a further variant which is not illustrated, when the storage reservoir is located above the absorber, use can be made of the spreading of the inner casing which reduces or increases the capacity of the absorber in order to force the water in the absorber towards the storage reservoir or enable it to return from the reservoir into the absorber.

The control of the spreading movement or retraction movement of the inner casing of the absorber and the opening of the connection may be controlled manually or by means of the circuit controlling the installation.

Finally, in accordance with a variant which is not illustrated, the inner casing consists of a cylinder which is pierced by supports displaced in radial slots and providing the inner cylinder with an adjustable diameter.

We claim:

1. A sea water desalination apparatus, comprising:
   (a) a closed, water-heating, cell (I) partially transparent to the sun's rays and having an interior assembly comprising two closed casings (3,4) which surround one another and create therebetween a greenhouse effect, said two casings including:
      an outer casing (3) made from a material which is transparent to the sun's rays, and
      an inner casing (4) made from a material which absorbs the sun's rays, said inner casing defining on its interior a heating chamber (5);
   (b) a closed, water-cooling, cell (II) partially transparent to the sun's rays and having an interior assembly of two closed casings ($3_1,4_1$) which surround one another and create therebetween a greenhouse effect, said two casings including:
      an outer casing ($3_1$) made from a material which is transparent to the sun's rays, and
      an inner casing ($4_1$) covered with a moisture-absorbing material (20), and said inner casing defining on its interior a cooling chamber ($5_1$);
   (c) a water reservoir (21) for cooperating with the inner casing ($4_1$) to humidity the material (20);
   (d) a duct (11) for supplying the heating chamber (5) with saline water to be heated;
   (e) a duct (12) between the heating chamber and the cooling chamber for discharging steam produced in the heating chamber (5) into the cooling chamber ($5_1$) which then acts as condenser;
   (f) a condensate collecting tank ($8_1$) connected to the cooling chamber ($5_1$) by a cooling duct controlled by a valve ($7_1$), said tank having a tap ($10_1$) for drawing off desalinated water;
   (g) means (14,17) for varying the volume capacity of the heating chamber (5); and
   (h) means ($14_1,17_1$) for varying the volume capacity of the cooling chamber ($5_1$).

2. A sea water desalination apparatus in accordance with claim 1, wherein the means for varying the capacity of the heating chamber (5) comprises a partition (14) attached to a bellows (17) within said chamber, and wherein the means for varying the capacity of the cooling chamber ($5_1$) comprises a partition ($14_1$) attached to a bellows ($17_1$) within said chamber, said partitions being movable by sliding rods ($18,18_1$) in order to vary the volume of the bellows.

3. A sea water desalination apparatus in accordance with claim 2, further comprising each sliding rod ($18,18_1$) being provided with a respective compensating spring ($19,19_1$) to enable its respective chamber to compensate for expansion caused by water freezing.

* * * * *